United States Patent
Pärssinen et al.

(10) Patent No.: US 6,647,273 B2
(45) Date of Patent: Nov. 11, 2003

(54) METHOD AND APPARATUS FOR REDUCING POWER CONSUMPTION IN TRANSCEIVERS IN WIRELESS COMMUNICATIONS SYSTEMS HAVING A POWER CONTROL LOOP

(75) Inventors: Aarno Pärssinen, Espoo (FI); Jussi Vepsäläinen, Helsinki (FI); Pauli Seppinen, Espoo (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 10/034,837

(22) Filed: Dec. 28, 2001

(65) Prior Publication Data

US 2003/0124983 A1 Jul. 3, 2003

(51) Int. Cl.⁷ .............................. H04B 7/00; H04Q 7/20
(52) U.S. Cl. .................. 455/522; 455/574; 455/67.11; 455/226.1
(58) Field of Search .................. 455/553, 69, 522, 455/550, 423, 425, 67.11, 343.1, 226.1, 184.1, 226.3, 574

(56) References Cited

U.S. PATENT DOCUMENTS

| | | |
|---|---|---|
| 5,701,600 A | 12/1997 | Wetters et al. |
| 6,029,074 A * | 2/2000 | Irvin .......................... 455/571 |
| 6,370,364 B1 | 4/2002 | Liimatainen |
| 6,473,623 B1 | 10/2002 | Benveniste |

FOREIGN PATENT DOCUMENTS

EP 0 951 138 A1 10/1999 ............ H03D/7/14

* cited by examiner

*Primary Examiner*—Nguyen T. Vo
*Assistant Examiner*—Temica M. Davis
(74) *Attorney, Agent, or Firm*—Ware Fressola Van Der Sluys & Adolphson LLP

(57) ABSTRACT

An apparatus (100) and corresponding method for use by a first transceiver in saving power when communicating over a wireless communication system with a second transceiver, the first having an operating cycle including an interval in which it sends transmit power requests to the second, the transmit power requests being made based on measurements of the signal received by the first and performed in an interval of the operating cycle in which the operational parameters correspond to a power control measurement state. The method includes: when no power control measurements are being made, a step (44b) of enabling receiver tuning to adjust the receiver operational parameters to place the receiver in a less power-consuming internal state.

6 Claims, 4 Drawing Sheets

METHOD AND APPARATUS FOR REDUCING POWER CONSUMPTION IN TRANSCEIVERS IN WIRELESS COMMUNICATIONS SYSTEMS HAVING A POWER CONTROL LOOP

FIELD OF THE INVENTION

The present invention relates to the field of cellular telephony, and more particularly to power consumed by the receiver portion of a transceiver used in wireless communication.

BACKGROUND OF THE INVENTION

So-called third generation mobile phones, expected to become available in the near future, will consume significantly more power than current generation mobile phones because of the many additional services the third-generation mobiles will provide. Power is consumed by the transceiver of a mobile phone in both transmitting and receiving wireless signals. A mobile phone in communication with a base station (called a node B in third-generation cellular systems) uses a power control loop to adjust the transmit power of the mobile so that it is high enough, but only just high enough, for a signal from the mobile to be received essentially error-free by the base station. This is a basic requirement for any system using code division multiple access (CDMA) to maximize the capacity of the system. Also other radio systems typically use some kind of power control but the requirements are more relaxed. There is also a power control loop used to adjust the transmit power of the base station, which is the subject matter to which the present invention is directed.

The output power of the base station for each individual code channel is based on the properties of both the radio path and the receiver performance. The power control loop operates based on the measurements of received signal strength (RSS) and/or estimate for the signal-to-interference ratio (SIR). It is very difficult if not impossible to distinguish whether the RSS and especially SIR estimates are dominated by the receiver performance instead of the radio channel. In wideband code division multiple access (WCDMA), only the SIR estimate is used for steering the power control loop. Traditionally it has been assumed that the receiver parameters will have significant effect on the performance only when the received signal is close to the sensitivity of the receiver. In that case it is acceptable that they will affect the power control loop. At other signal levels, the radio path including propagation loss and fading and the other code channels at the band of interest are the only significant effects on SIR or RSS. However, when minimizing the power consumption, the receiver performance parameters will also change significantly even at relatively high signal levels. If a logic module with high precision is controlling the receiver performance and thus optimizing the power consumption, there will be a larger range of input power levels in which the receiver performance affects the SIR. The parameters of a receiver change whenever power consumption is scaled by for example adjusting supply current or supply voltage. Therefore, the power control loop will be forced to increase the transmitted power unnecessarily, which will lead to power competition in a CDMA system, reducing the available capacity. Thus, the scaling of power use in a receiver may disturb the power control loop. In order to allow an optimal receiver control algorithm without violating the power control loop of the system, a method that can separate a power control loop from internal control of various parameters in the receiver is required.

SUMMARY OF THE INVENTION

Accordingly, a first aspect of the invention provides a method for use by a transceiver of a first device communicating over a wireless communication system with a second device, the method characterized in that it comprises: upon a receiver portion of the transceiver of the first device completing making measurements needed for power control, transitioning the receiver portion from a power control measurement mode for making at least one predetermined power control measurement, in which at least one power control measurement is made for power control of either the first device or the second device, to an adaptive tuning mode, in which the receiver portion adapts to current conditions and so is tuned to an adaptively selected internal state; and upon the receiver portion of the first device being again scheduled to make measurements needed for power control, transitioning the receiver portion of the transceiver of the first device from the adaptive tuning mode, and so from the adaptively selected internal state, to the power control measurement mode.

A second aspect of the invention provides a method for use by a receiver of a first transceiver communicating over a wireless communication system with a second transceiver, the first transceiver having an operating cycle including an interval in which the first transceiver sends transmit power requests to the second transceiver for controlling the transmit power of the second transceiver, the transmit power requests being made based on measurements of the signal received by the first transceiver and performed in an interval of the operating cycle in which the operational parameters of the receiver are set to predetermined measurement mode values defining a power control measurement state, the method characterized in that it comprises: a step of waiting for an interval of the operating cycle of the receiver in which no measurements for power control are scheduled and then enabling receiver tuning to adjust the operational parameters of the receiver to place the receiver in an internal state; a step of disabling receiver tuning when measurements for power control are again scheduled; and a step of placing the receiver back into the power control measurement state.

In further accord with the second aspect of the invention, the method is further characterized in that, before enabling receiver tuning, the receiver is placed in the internal state to which the receiver was tuned during the previous duty cycle.

A third aspect of the invention provides an apparatus for use by a transceiver of a first device communicating over a wireless communication system with a second device, characterized in that it comprises: means for transitioning the receiver portion from a predetermined power control measurement mode, in which measurements are made for power control of either the first device or the second device, to an adaptive tuning mode, in which the receiver adapts to current conditions and so is tuned to an adaptively selected internal state, the transitioning being triggered by the receiver portion of the transceiver of the first device completing a set of measurements needed for power control; and means for transitioning the receiver portion of the transceiver of the first device from the adaptive tuning mode to the power control measurement mode when the receiver of the first device is again scheduled to make measurements needed for power control.

A fourth aspect of the invention provides an apparatus for use with a receiver of a first transceiver communicating over a wireless communication system with a second transceiver, the first transceiver having an operating cycle including an interval in which the first transceiver sends transmit power requests to the second transceiver for controlling the transmit power of the second transceiver, the transmit power requests being made based on measurements of the signal received by the first transceiver and performed in an interval of the operating cycle in which the operational parameters of the receiver are set to predetermined measurement mode values defining a power control measurement state, the apparatus characterized in that it comprises: control mode logic for waiting for an interval of the operating cycle of the receiver in which no measurements for power control are scheduled, responsive to a synchronization signal indicating information about timing of received data, and further responsive to system state information indicating information about timing for making power control measurements, for providing enable and disable tuning commands; and receiver tuning logic, responsive to the enable and disable tuning commands, for providing tuning commands adjusting operational parameters of the receiver so as to place the receiver in an internal state adapted to existing operating conditions.

In further accord with the fourth aspect of the invention, the apparatus is further characterized in that in response to an enable tuning command, the tuning commands issued by the receiver tuning logic place the receiver in the internal state to which the receiver was tuned during the previous duty cycle.

Thus, in the present invention, a method that can separate a power control loop from internal control of various parameters in the receiver is provided by dividing the reception in time into two periods. The system measurements can be performed during one time slot at fixed predetermined conditions and the rest of the time can be used for internal control of the receiver. The required time to do the system measurements can be short compared to the measurement period without significantly deteriorating the accuracy of the required measurements. Hence, most of the time it is possible to control the receiver parameters without strict limitations to minimize the power consumption. The invention permits having an adaptively tunable receiver in continuous reception without violating the power control loop of a CDMA system or any other radio system that uses a similar kind of power control loop.

Although the invention relates primarily to the control of a mobile cellular receiver with respect to power consumption, it is possible to use the invention also in other portable radio receivers or even in a base station using a power control loop. The optimized functionality in the receiver need not be only with respect to power consumption; the receiver performance can also be optimized according to the invention based on some other parameter, such as a noise figure.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
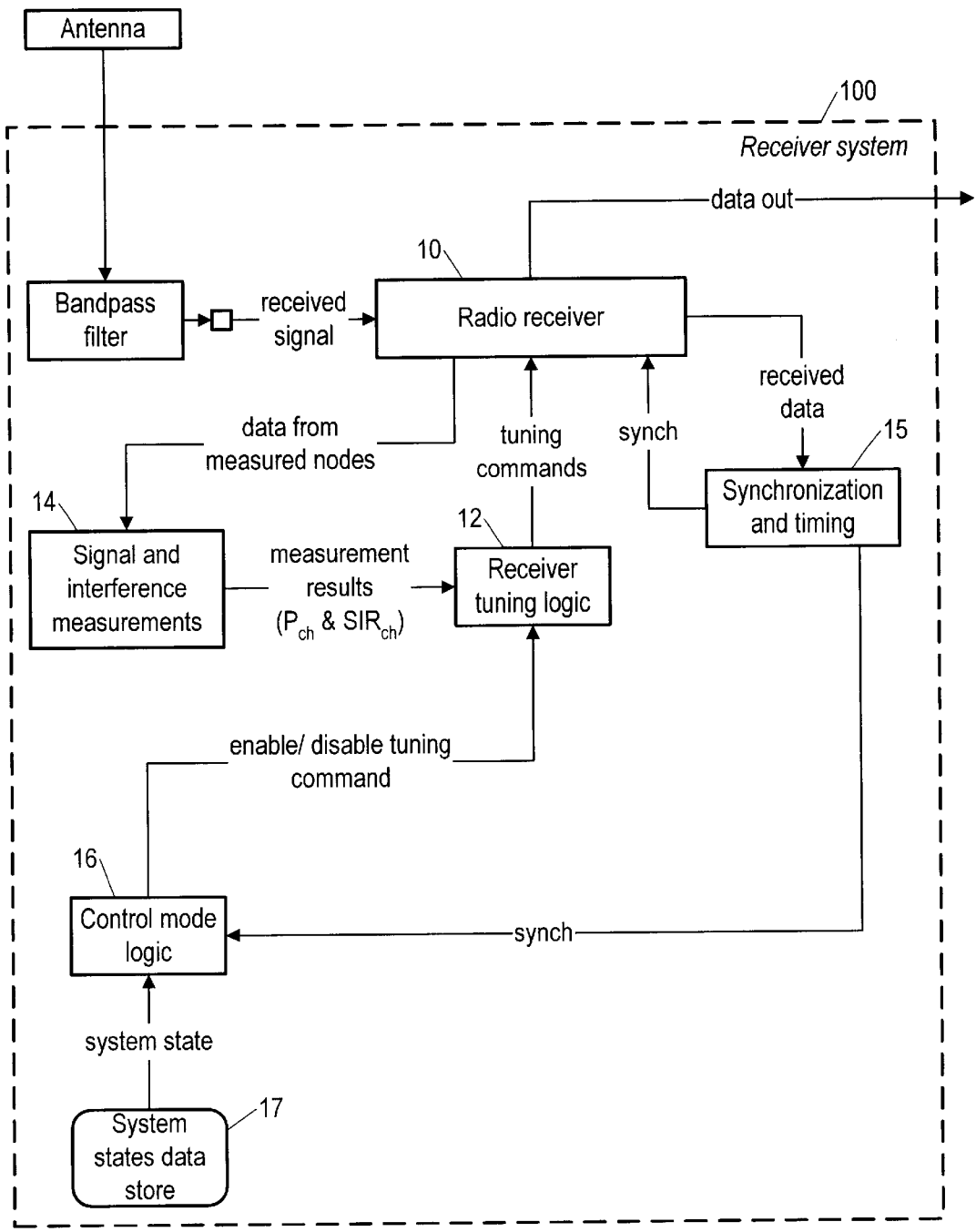
FIG. 1 is a block diagram of parts of a transceiver according to the invention, including a receiver and a tuning logic module.

Referring now to FIG. 1, a receiver system 100 according to the invention is shown as including a radio receiver 10 for receiving a signal received by an antenna and then bandpass filtered, the radio receiver 10 receiving tuning commands from a receiver tuning logic module 12. The tuning commands are determined based on measurement results, and in particular the power $P_{ch}$ in the channel to which the radio receiver is being tuned, i.e. the received signal strength (RSS), and the signal-to-interference ratio ($SIR_{ch}$) measurements for that channel, which are determined by a signal and interference measurements module 14, a digital signal processing module, based on data collected by the radio receiver 10 from various nodes (points) in the radio receiver system 100 and provided to the signal and interference measurements module 14. (The signal and interference measurements module 14 provides measurement results including the power of a channel, $P_{ch}$, and the signal to interference ratio for a channel ($SIR_{ch}$), as well as other measurement results not indicated, such as $SIR_{est}$, wideband RF power $P_{wb}$ and possibly intermodulation power, all known in the art.) The receiver tuning logic 12 sends the tuning commands to the radio receiver 10. A synchronization and timing module 15 synchronizes the operation of the control mode logic module 16, based on received data provided by the radio receiver 10, and provides commands to the receiver tuning logic module 12 (according to the synchronization signals the control mode logic module 16 receives from the synchronization and timing module 15) that either enable or disable tuning the receiver.

The enable/disable tuning commands provided by the control mode logic module 16 include commands to the receiver tuning logic module 12 to place the receiver in one or another system state, depending on whether the receiver tuning logic module 12 is being sent a command to enable tuning or being sent a command to disable tuning, as explained below. The receiver maintains information about the actual system states of the receiver 10 in a system states data store 17 so as to be able to configure the radio receiver 10 in different states according to the invention as described below. The system state information in the system states data store 17 includes the frame structure of the radio system, as defined in the system specification (and as shown as an example in FIG. 3), and the points in time during an operating cycle when power control measurements are scheduled for the power control loop. These parameters can be changed depending on conditions, a longer time period being needed for more accurate signal measurements in poorer conditions. The result of the power control measurement can be also a weighted sum of current and previous power control measurements. This has been used earlier in practical algorithms. Also, the result can be a weighted sum between measurement and tuning modes during one or several control cycles. The weighting factors can be selected so that the effect on the power control loop is negligible.

Figure 2:
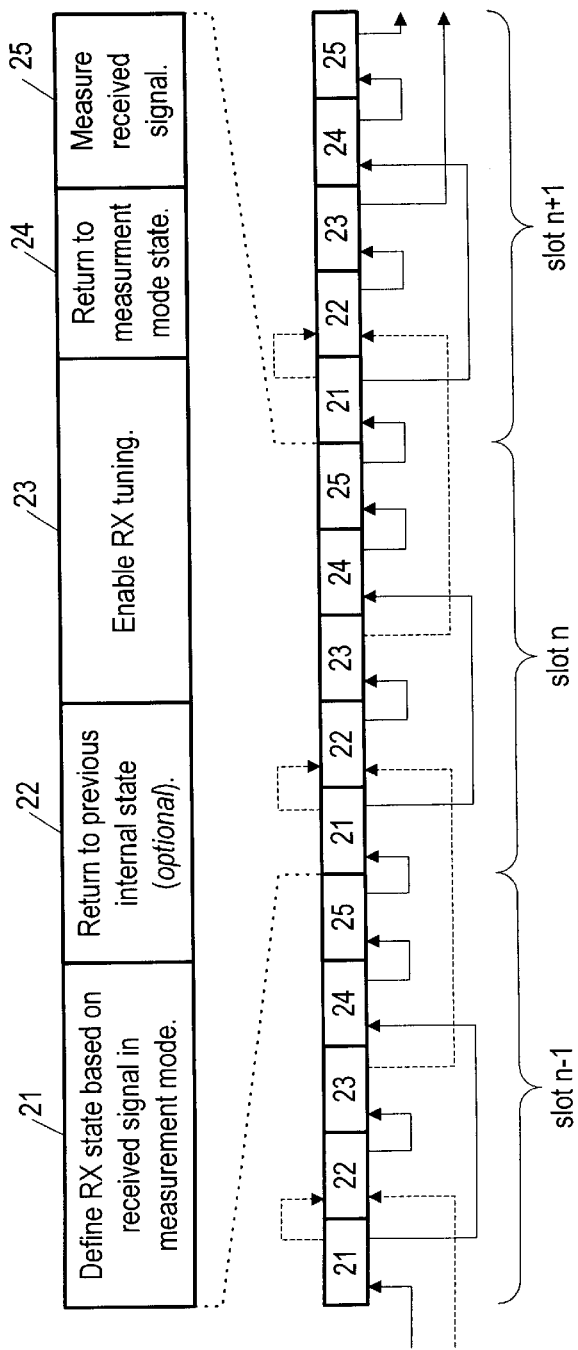
FIG. 2 is a time-domain map indicating dynamic tuning of a receiver according to the invention, showing different receiver modes operating during one transmission power control cycle, and also showing the exchange of state information between different receiver modes in a transmission power control cycle and also between different receiver modes in different transmission power control: cycles.

Referring now to FIG. 2, a sequence of steps taken by the receiver system 100 of FIG. 1 is shown as including a first step 21 in which the receiver state is defined, based on the signal received in measurement mode from a previous step in which the received signal is measured. In a second optional step 22, since according to the invention the receiver would have been tuned in some previous step resulting in tuner parameters having a final set of values determined in that previous step, the receiver is returned to the previous internal state defined by the set of parameters to which the receiver was tuned in that previous step. As mentioned, the step of returning to the previous internal state is an optional step; alternatively, in the next step 23 in which the receiver tuning is enabled, the tuning can commence from the state in which the receiver is configured to make power control measurements. It is the step of enabling receiver tuning in a time interval during which power control measurements are not being made that is the essence of the invention. After the step of enabling receiver tuning in such a time interval, the receiver, in the next step 24, is returned to the measurement mode state defined by the previous measurement interval in step 21. Finally, in a step 25, the receiver measures the received signal for providing power control information and for providing a transmit power request. The various steps shown in FIG. 2 constitute one time slot in a power control loop. Often the receiver gain control is performed in the same cycle with synchronized timing. FIG. 2 also shows the single time slot of five periods 21–25 occurring between two other time slots, each also comprising five periods, and in addition shows the transfer of information from one period to another. Thus for example, period 23 of time slot N−1 provides to period 22 of time slot N the state to which the receiver was tuned at the end of the third period of time slot N−1. Dashed lines showing either the transmission of information from period 21 to period 22 within each time slot or from the end of period 23 of the previous time slot to the beginning of period 22 of the successive time slot indicate the two different options for the starting point of the receiver tuning according to the invention. The receiver can either begin tuning using as a starting point the parameters last used for the signal power control measurement, or the receiver tuning can use as a starting point the parameters last determined in the receiver tuning step 23 of the previous time slot.

Figure 3:
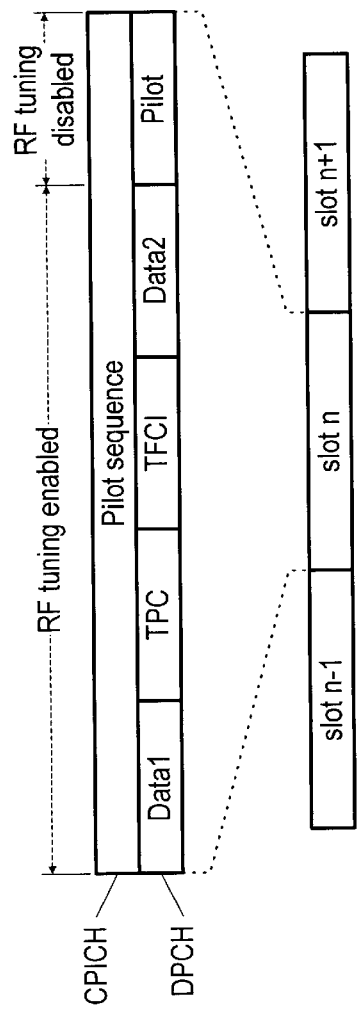
FIG. 3 is a time-domain map corresponding to the time-domain map of FIG. 2, but specialized for dynamic tuning of a WCDMA FDD (frequency division duplex) receiver.

Referring now to FIG. 3, the use of the present invention in case of wireless communications using WCDMA (wideband code division multiple access) in FDD (frequency division duplexing) mode is illustrated, showing that the tuning of a CDMA receiver is enabled throughout a time slot n except during a period in which the dedicated physical channel (DPCH) being received by the CDMA receiver conveys a pilot signal. The period during which the receiver receives the pilot signal includes period 25 of FIG. 2. (FIG. 3 also shows the common pilot channel, CPICH, conveying a pilot sequence throughout the time slot n.) During the periods in which the RF receiver tuning is enabled, the dedicated physical channel conveys first a unit of data indicated as data 1, then a transmit power control (TPC) signal, then a transport format combination identifier (TFCI), and then a second item of data indicated as data 2.

The above describes a frame structure of WCDMA FDD transmission; a similar arrangement can be used with other frame structures or slot formats. What must be considered separately is the required period and the most suitable data transmission during which the measurements should be made. The principle shown in FIG. 2 can be applied in the same manner to other frame structures and also to other radio systems. FIG. 3 is a specific example of the technique to be applied in FDD WCDMA and it can be considered as the best mode of implementation for such an application.

Figure 4:
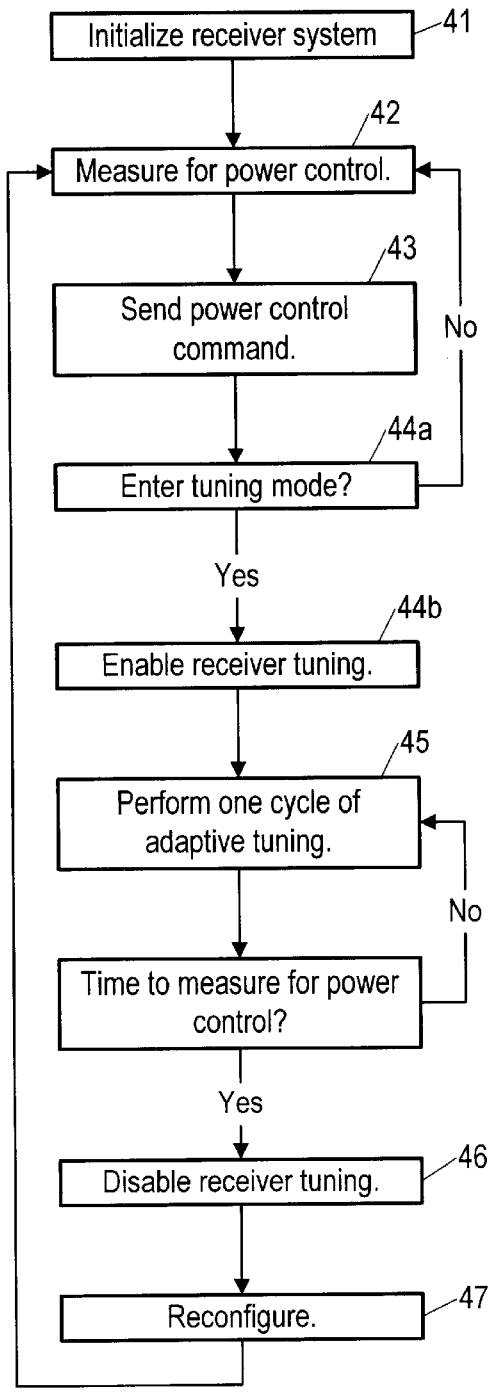
FIG. 4 is a flow chart of a method for dynamic tuning of a receiver, according to the invention.

Referring now to FIG. 4 and also to FIG. 1, a flow chart indicating a method according to the invention is shown as beginning with a first step 41 in which the receiver system 100 of a transceiver (not shown) is initialized, the transceiver assumed to be communicating with another, second transceiver during the use of the method. In a next step 42, power control measurements are performed with the receiver 10 in a predetermined measurement mode. In a next step 43, power control commands are then sent to the communicating transceiver by the transceiver having the receiver 10. Then if the receiver system 100 is programmed to practice the invention, and so enters the tuning mode, then, after waiting until no measurements are scheduled and so deciding when to enter tuning mode per a decision step 44a, in a next step 44b receiver tuning is enabled; in a next step 45, a cycle of adaptive tuning is performed (the receiver tuning logic module 12 sending tuning commands to the radio receiver 10), and at the end of that cycle, if it is time to again measure for power control, in a next step 46, receiver tuning is disabled, and in a next step 47, the receiver system reconfigures itself for making power control measurements and then returns to step 42 in which it makes the power control measurements. But if it is not yet time to measure for power control, the step 45 of performing a cycle of adaptive tuning is repeated.

Figure 5:
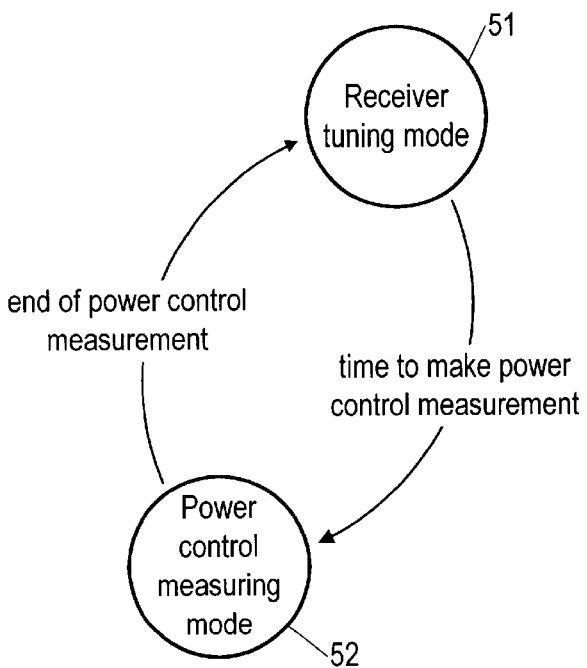
FIG. 5 is a state transition diagram for a receiver system (including a receiver and others of the modules shown in FIG. 1) in which the receiver is undergoing dynamic tuning according to the invention.

Referring now to FIG. 5 and also to FIG. 1, from another perspective, the invention consists of having the receiver system 100 transition between two different modes 51 52, a receiver tuning mode 51, and a power control measuring mode 52. With the receiver 10 initially in the power control measuring mode 52, the receiver 10 transitions to the receiver tuning mode 51 when the receiver system completes a set of power control measurements. In the receiver tuning mode, the receiver 10 is adjusted (tuned) to one or another adaptively selected internal state. The receiver 10 remains in the receiver tuning mode 51 until it is time to make the next set of power control measurements.

Figure 6:
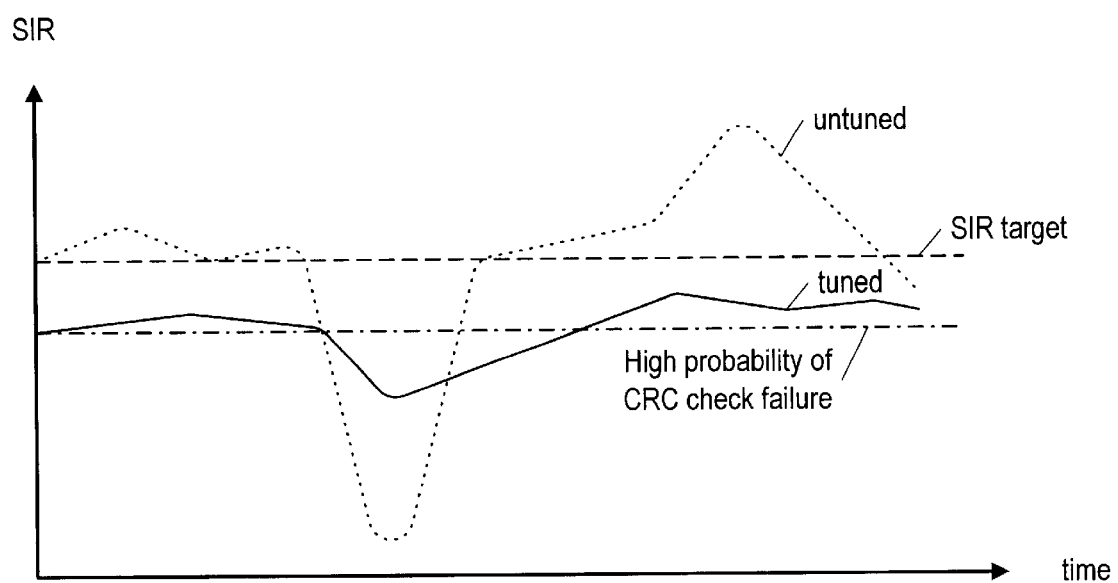
FIG. 6 is a typical graph of SIR (signal to interference ratio) versus time for a receiver undergoing dynamic tuning according to the invention and also for a receiver not being tuned.

Referring now to FIG. 6, a typical SIR (signal-to-interference ratio) as a function of time is shown for a receiver 10 (FIG. 1) both with receiver tuning according to the invention and also without receiver tuning. If the receiver is untuned, the SIR is usually significantly above what is necessary for acceptable detection, the value required for acceptable detection being shown in FIG. 6 as the level indicated with a dash-dot line below which there is a high probability of a CRC (cyclic redundancy code) check failure. Maintaining the receiver in an untuned condition usually provides more than adequate margin for error. With tuning, the SIR can be continuously set closer to an SIR target value by adjusting the receiver parameters. Thus, when the SIR is greater than the SIR target value, the receiver dynamic range can be reduced and less power can be used without increasing the block error rate (BLER). It is also possible that with appropriate control mechanisms a receiver according to the invention can even improve its performance compared to an untuned receiver, as indicated in FIG. 6 at the point time when the untuned SIR dips substantially below the SIR level below which there is a high probability of CRC check failure. At that point in time, as illustrated in FIG. 6, the tuned SIR behavior does not drop as far below the SIR value for high CRC check value as does the untuned SIR behavior. Such a comparison is valid however only in cases where the internal parameters of a receiver dominate the interference.

It should be understood that although the present invention has been shown and described in connection with closed loop power control, it is also possible to use the invention where open loop power control is implemented. Regardless of whether the power control is open or closed loop, according to the invention, tuning is enabled only during intervals when measurements for power control are not being made. The perspective provided by FIG. 5 illustrates the essence of the invention in a way that is not in any way dependent on whether the receiver system is communicating according to a protocol using closed loop power control.

The invention can be implemented with customized logic on the same die as any of the analog or mixed mode chips, or on a digital application specific integrated circuit (ASIC) or programmed digital signal processor (DSP) or microprocessor. The preferred mode of implementation would have the control signal that causes transitioning between the tuning mode and the measurement mode come from an ASIC, DSP or microprocessor, with logic for steering the transitions between the two modes provided on an analog or mixed mode chip.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for use by a transceiver of a first device communicating over a wireless communication system with a second device, the method characterized in that it comprises:

upon a receiver portion (100) of the transceiver of the first device completing making measurements needed for power control, transitioning the receiver portion (100) from a power control measurement mode (52) for making at least one predetermined power control measurement, in which at least one power control measurement is made for power control of either the first device or the second device, to an adaptive tuning mode (51), in which the receiver portion (100) adapts to current conditions and so is tuned to an adaptively selected internal state; and upon the receiver portion (100) of the first device being again scheduled to make measurements needed for power control, transitioning the receiver portion (100) of the transceiver of the first device from the adaptive tuning mode (51), and so from the adaptively selected internal state, to the power control measurement mode (52).

2. A method for use by a receiver (10) of a first transceiver communicating over a wireless communication system with a second transceiver, the first transceiver having an operating cycle including an interval in which the first transceiver sends transmit power requests to the second transceiver for controlling the transmit power of the second transceiver, the transmit power requests being made based on measurements of the signal received by the first transceiver and performed in an interval of the operating cycle in which the operational parameters of the receiver (10) are set to predetermined measurement mode values defining a power control measurement state, the method characterized in that it comprises:

a) a step (44a) of waiting for an interval of the operating cycle of the receiver (10) in which no measurements for power control are scheduled and then enabling receiver tuning in a step (44b) to adjust the operational parameters of the receiver (10) to place the receiver (10) in an internal state;

b) a step (46) of disabling receiver tuning when measurements for power control are again scheduled; and c) a step (47) of placing the receiver (10) back into the power control measurement state.

3. The method of claim 2, further characterized in that, before enabling receiver tuning, the receiver (10) is placed in the internal state to which the receiver (10) was tuned during the previous duty cycle.

4. An apparatus for use by a transceiver of a first device communicating over a wireless communication system with a second device, characterized in that it comprises:

means (15 16 17) for transitioning the receiver portion from a predetermined power control measurement mode (52), in which measurements are made for power control of either the first device or the second device, to an adaptive tuning mode (51), in which the receiver adapts to current conditions and so is tuned to an adaptively selected internal state, the transitioning being triggered by the receiver portion (100) of the transceiver of the first device completing a set of measurements needed for power control; and means (15 16 17) for transitioning the receiver portion (100) of the transceiver of the first device from the adaptive tuning mode (51) to the power control measurement mode (52) when the receiver of the first device is again scheduled to make measurements needed for power control.

5. An apparatus (100) for use with the receiver (10) of a first transceiver communicating over a wireless communication system with a second transceiver, the first transceiver having an operating cycle including an interval in which the first transceiver sends transmit power requests to the second transceiver for controlling the transmit power of the second transceiver, the transmit power requests being made based on measurements of the signal received by the first transceiver and performed in an interval of the operating cycle in which the operational parameters of the receiver are set to predetermined measurement mode values defining a power control measurement state, the apparatus (100) characterized in that it comprises:

a) control mode logic (16) for waiting for an interval of the operating cycle of the receiver (10) in which no measurements for power control are scheduled, responsive to a synchronization signal indicating information about timing of received data, and further responsive to system state information indicating information about timing for making power control measurements, for providing enable and disable tuning commands; and b) receiver tuning logic (12), responsive to the enable and disable tuning commands, for providing tuning commands adjusting operational parameters of the receiver (10) so as to place the receiver (10) in an internal state adapted to existing operating conditions.

6. The apparatus of claim 5, further characterized in that in response to an enable tuning command, the tuning commands issued by the receiver tuning logic (12) place the receiver (10) in the internal state to which the receiver (10) was tuned during the previous duty cycle.

* * * * *

UNITED STATES PATENT AND TRADEMARK OFFICE
CERTIFICATE OF CORRECTION

PATENT NO. : 6,647,273 B2
DATED : November 11, 2003
INVENTOR(S) : Aarno Pärssinen et al.

It is certified that error appears in the above-identified patent and that said Letters Patent is hereby corrected as shown below:

<u>Column 4,</u>
Line 4, "power control: cycles;" should be -- power control cycles; --.

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,647,273 B2 |
| APPLICATION NO. | : 10/034837 |
| DATED | : November 11, 2003 |
| INVENTOR(S) | : Aarno Parssinen et al. |

It is certified that error appears in the above-identified patent and that said Letters Patent is hereby corrected as shown below:

In column 4, line 46, after "provided by the radio receiver 10, and" insert --the control mode logic module 16--.

Signed and Sealed this

Second Day of October, 2007

JON W. DUDAS
*Director of the United States Patent and Trademark Office*